United States Patent
Shigemasa et al.

(10) Patent No.: US 11,999,832 B2
(45) Date of Patent: Jun. 4, 2024

(54) POLYVINYL ALCOHOL-BASED RESIN FILM

(71) Applicant: AICELLO CORPORATION, Toyohashi (JP)

(72) Inventors: Mizuki Shigemasa, Toyohashi (JP); Yohei Kuchina, Toyohashi (JP); Hirokazu Ohsawa, Toyohashi (JP)

(73) Assignee: AICELLO CORPORATION, Toyohashi (JP)

( * ) Notice: Subject to any disclaimer, the term of this patent is extended or adjusted under 35 U.S.C. 154(b) by 342 days.

(21) Appl. No.: 17/423,845

(22) PCT Filed: Oct. 10, 2019

(86) PCT No.: PCT/JP2019/040119
§ 371 (c)(1),
(2) Date: Jul. 16, 2021

(87) PCT Pub. No.: WO2020/158056
PCT Pub. Date: Aug. 6, 2020

(65) Prior Publication Data
US 2022/0081522 A1    Mar. 17, 2022

(30) Foreign Application Priority Data

Jan. 30, 2019   (JP) ................. 2019-014812

(51) Int. Cl.
| | |
|---|---|
| *C08J 5/18* | (2006.01) |
| *B32B 27/08* | (2006.01) |
| *B32B 27/30* | (2006.01) |
| *C08K 5/053* | (2006.01) |
| *C08K 5/098* | (2006.01) |

(52) U.S. Cl.
CPC .............. *C08J 5/18* (2013.01); *B32B 27/08* (2013.01); *B32B 27/306* (2013.01); *C08J 2329/04* (2013.01); *C08K 5/053* (2013.01); *C08K 5/098* (2013.01)

(58) Field of Classification Search
None
See application file for complete search history.

(56) References Cited

U.S. PATENT DOCUMENTS

| | | |
|---|---|---|
| 2004/0161557 A1 | 8/2004 | Verrall et al. |
| 2006/0127458 A1 | 6/2006 | Kiser et al. |
| 2012/0015201 A1 | 1/2012 | Zecha et al. |
| 2013/0296761 A1 | 11/2013 | Goto et al. |
| 2016/0236143 A1 | 8/2016 | Yin |
| 2018/0105338 A1 | 4/2018 | Ieda et al. |
| 2019/0382580 A1* | 12/2019 | Kuwahara ............. C09J 163/10 |

FOREIGN PATENT DOCUMENTS

| | | |
|---|---|---|
| CN | 106798665 A | 6/2017 |
| JP | 2005520812 A | 7/2005 |
| JP | 2006342236 A | 12/2006 |
| JP | 2007526294 A | 9/2007 |
| JP | 2008050574 A | 3/2008 |
| JP | 2010012778 A | 1/2010 |
| JP | 2016069442 A | 5/2016 |
| JP | 2018018062 A | 2/2018 |
| WO | 03061721 A1 | 7/2003 |
| WO | 2005092271 A1 | 10/2005 |
| WO | 2012063947 A1 | 5/2012 |
| WO | 2016160116 A1 | 10/2016 |
| WO | 2016167135 A1 | 10/2016 |
| WO | WO 2018/155032 A1 * | 8/2018 |

OTHER PUBLICATIONS

Extended European Search Report (EESR) dated Nov. 10, 2022, issued for European counterpart patent application No. EP19912789.5 (6 pages).
International Search Report (ISR) mailed Dec. 24, 2019, issued for International application No. PCT/JP2019/040119. (2 pages).
International Preliminary Report on Patentability, dated Jul. 27, 2021, for corresponding international application PCT/JP2019/040119 (1 page).
Notification Concerning Transmittal of International Preliminary Report on Patentability, mailed Aug. 12, 2021, for corresponding international application PCT/JP2019/040119 (1 page).
Notification of Transmittal of Translation of the International Preliminary Report on Patentability, mailed Aug. 12, 2021, for corresponding international application PCT/JP2019/040119 (1 page).
Written Opinion of the International Searching Authority, mailed Dec. 24, 2019, for corresponding international application PCT/JP2019/040119 (8 page).

* cited by examiner

*Primary Examiner* — Sheeba Ahmed
(74) *Attorney, Agent, or Firm* — Law Office of Katsuhiro Arai

(57) ABSTRACT

An object is to smoothly obtain, through coating of the surface of a metal roll, a polyvinyl alcohol-based resin film that contains a polyvinyl alcohol-based resin and can be used in a water sealing process, and/or to lower the adhesion force of such film on metal seal bar, etc., during heat sealing. As a solution, a polyvinyl alcohol-based resin film containing components A to C below is provided:
  A. a polyvinyl alcohol-based resin;
  B. a plasticizer; and
  C. one or more types selected from sodium polyoxyethylene alkyl ether acetate, disodium polyoxyethylene alkyl sulfosuccinate salt, N-alkyl-N-methyl-ß-alanine sodium salt, and sodium alkane-1,2-diol acetate salt.

12 Claims, No Drawings

POLYVINYL ALCOHOL-BASED RESIN FILM

CROSS-REFERENCE TO RELATED APPLICATIONS

This application is the U.S. National Phase under 35 U.S.C. § 371 of International Application PCT/JP2019/040119, filed Oct. 10, 2019, which claims priority to Japanese Patent Application No. JP2019-014812, filed Jan. 30, 2019. The International Application was published under PCT Article 21(2) in a language other than English.

TECHNICAL FIELD

The present invention relates to a polyvinyl alcohol-based resin film that can be formed or heat-sealed more smoothly.

BACKGROUND ART

As described in Patent Literature 1, it is public knowledge that a film is formed by casting on the surface of a metal roll a polyvinyl alcohol solution containing polyvinyl alcohol, plasticizer, and polyoxyethylene alkyl ether-based surfactant, and that the obtained polyvinyl alcohol-based resin film has good releasability from the metal roll.

As described in Patent Literature 2, it is public knowledge that a polyoxyethylene alkyl amine or other surfactant is contained beforehand in a polyvinyl alcohol-based resin solution so that, once a polyvinyl alcohol-based resin film is formed therefrom on a drum-shaped roll, the film will have better releasability from the roll.

As described in Patent Literature 3, a polyvinyl alcohol-based resin film for wrapping a liquid detergent, etc., into single-use pods, which particularly contains modified and unmodified polyvinyl alcohol-based resins, glycerin, sorbitol, and in some cases, colorants, is public knowledge. And, wrapping a liquid detergent, etc., with the polyvinyl alcohol-based resin film requires a process of heat-sealing its end parts together to hermetically seal the liquid detergent.

At this time, sufficient heating is required to ensure the seal is hermetic. Additionally, to perform hermetic sealing continuously by means of heat sealing, the end parts of the polyvinyl alcohol-based resin film are pressure-bonded together using a heated seal bar, etc.

BACKGROUND ART LITERATURE

Patent Literature

Patent Literature 1: Japanese Patent Laid-open No. 2010-12778
Patent Literature 2: Japanese Patent Laid-open No. 2006-342236
Patent Literature 3: International Patent Laid-open No. 2016/160116

SUMMARY OF THE INVENTION

Problems to be Solved by the Invention

A method for manufacturing a polyvinyl alcohol-based resin film by supplying a polyvinyl alcohol-based resin solution onto the surface of a rotating metal roll, etc., in a manner forming a thin film, and then drying it on the metal roll, etc., followed by releasing the formed polyvinyl alcohol-based resin film from the surface of the metal roll, etc., is public knowledge.

However, the formed polyvinyl alcohol-based resin film may stick to the surface of the metal roll, resulting in the surface of the polyvinyl alcohol-based resin film not releasing at least partially from the surface of the metal roll.

Such condition can cause the polyvinyl alcohol-based resin film to tear, etc., which requires that the formed polyvinyl alcohol-based resin film be released more smoothly from the surface of the metal roll, etc.

When a content like detergent is to be wrapped with a polyvinyl alcohol-based resin film, a process of water-sealing or heat-sealing together pieces of the polyvinyl alcohol-based resin film may be adopted.

One object of the present invention is to smoothly obtain, through casting of the surface of a metal roll, etc., a polyvinyl alcohol-based resin film that can be used in a water sealing or heat sealing process.

Furthermore, when a content like detergent is to be wrapped with a polyvinyl alcohol-based resin film, a process of heat-sealing together pieces of the polyvinyl alcohol-based resin film is adopted, as mentioned above. Here, a metal seal bar, metal seal roll, etc., with which to heat and pressure-bond the polyvinyl alcohol-based resin film is used in the heat sealing process.

This process of using a metal seal bar, etc., to perform heat sealing employs a means for bringing the heated metal seal bar, etc., into contact with a stack of two pieces of the polyvinyl alcohol-based resin film and, when the heating is complete, releasing the metal seal bar, etc., from the polyvinyl alcohol-based resin film.

This means that, due to the difficulty associated with the heat sealing process, polyvinyl alcohol-based resin films that are to be used in heat sealing are limited in materials that can be adopted, compared to polyvinyl alcohol-based resin films that are to be used in water sealing as mentioned above.

Normally the metal seal bar, etc., can be released from the heat-sealed polyvinyl alcohol-based resin film. Even when a particularly long polyvinyl alcohol-based resin film is contacted by the metal seal bar, etc., successively to be heat-sealed, movements of the polyvinyl alcohol-based resin film generate releasing forces against the metal seal bar, etc., and consequently the polyvinyl alcohol-based resin film is released from the metal seal bar, etc.

In some cases, however, the film cannot be released easily. When this happens, the heat-sealed polyvinyl alcohol-based resin film sticks to the metal seal bar, etc., necessitating a countermeasure such as lowering the heat sealing temperature or reducing production speed. In addition, sticking of the film inevitably results in a halting of the heat sealing process itself, leading to a drop in productivity.

Another object of the present invention is to study a composition of a polyvinyl alcohol-based resin film exerting lower adhesion strength on metal seal bars, etc., in order to solve the occurrence of phenomena that would lead to the aforementioned drop in productivity and prevent the film from sticking to metal seal bar, etc.

Means for Solving the Problems

As a result of studying in earnest to achieve the aforementioned objects, the inventor of the present invention found that the following means would provide solutions, and consequently completed the present invention:

1. A polyvinyl alcohol-based resin film containing components A to C below:
   A. a polyvinyl alcohol-based resin;
   B. a plasticizer; and
   C. one or more types selected from sodium polyoxyethylene alkyl ether acetate, disodium polyoxyethylene alkyl sulfosuccinate salt, N-alkyl-N-methyl-ß-alanine sodium salt, and sodium alkane-1,2-diol acetate salt.
2. The polyvinyl alcohol-based resin film according to 1, wherein component C comprises one or more types selected from sodium polyoxyethylene lauryl ether acetate, sodium polyoxyethylene tridecyl ether acetate, disodium polyoxyethylene alkyl sulfosuccinate salt, N-lauroyl-N-methyl-ß-alanine sodium salt, and sodium dodecane-1,2-diol acetate salt.
3. The polyvinyl alcohol-based resin film according to 1 or 2, wherein component B comprises one or more types selected from glycerin, sorbitol, polyethylene glycol and diglycerin.
4. The polyvinyl alcohol-based resin film according to any one of 1 to 3, wherein an alkali metal salt of fatty acid having 6 to 22 carbon atoms is contained as component D.
5. The polyvinyl alcohol-based resin film according to any one of 1 to 4, obtained by coating on a metal roll an aqueous solution of polyvinyl alcohol-based resin free from phosphorus atom-containing surfactant, drying the solution, and then releasing the resulting film from the metal roll, wherein the release strength of the film at the time of release is 550 gf/200 mm or lower.
6. The polyvinyl alcohol-based resin film according to any one of 1 to 5, wherein, when two pieces of the polyvinyl alcohol-based resin film are heated and pressed by a seal bar to be sealed, the adhesion strength of the polyvinyl alcohol-based resin film per 70 mm of width, on the seal bar heated to 150° C., is 500 gf/70 mm or lower.
7. A method for obtaining a polyvinyl alcohol-based resin film by supplying, onto a surface of a rotating metal roll, a polyvinyl alcohol-based resin film solution containing components A to C below:
   A. a polyvinyl alcohol-based resin;
   B. a plasticizer; and
   C. one or more types selected from sodium polyoxyethylene alkyl ether acetate, disodium polyoxyethylene alkyl sulfosuccinate salt, N-alkyl-N-methyl-ß-alanine sodium salt, and sodium alkane-1,2-diol acetate salt.

Effects of the Invention

According to the present invention, manufacturing of a polyvinyl alcohol-based resin film by supplying onto a metal roll, metal belt, etc. (hereinafter collectively referred to as "metal roll, etc."), a solution containing a polyvinyl alcohol-based resin, and then drying the solution to form a film, can be performed in a favorable manner. Specifically, when the formed polyvinyl alcohol-based resin film is released from the surface of the metal roll, etc., and rolled, the polyvinyl alcohol-based resin film releases easily from the surface of the metal roll, etc., so that the polyvinyl alcohol-based resin film does not tear or stick to the surface of the metal roll, etc.

Furthermore, according to the present invention, the polyvinyl alcohol-based resin film exhibits low adhesion strength on the metal seal bar, etc., when the polyvinyl alcohol-based resin film is heat-sealed, which means that the heat sealing process can be performed smoothly without the polyvinyl alcohol-based resin film sticking to the seal bar, etc.

MODE FOR CARRYING OUT THE INVENTION

The present invention is explained in detail.
(A. Polyvinyl Alcohol-Based Resin)
The polyvinyl alcohol-based resin film proposed by the present invention contains a polyvinyl alcohol-based resin.

The polyvinyl alcohol-based resin is not limited in any way, and any known polyvinyl alcohol-based resin may be used. Also, such polyvinyl alcohol-based resin is obtained according to any known method, by polymerizing a vinyl ester according to the solution polymerization method, bulk polymerization method, suspension polymerization method, etc., to obtain a polymer, and then saponifying the polymer. The saponification is performed using an alkali or acid, but use of an alkali is preferred. For the aforementioned polyvinyl alcohol-based resin, one type of polyvinyl alcohol-based resin may be used alone, or two or more types may be combined.

The aforementioned vinyl ester may be vinyl acetate, vinyl formate, vinyl propionate, vinyl butyrate, vinyl pivalate, vinyl versatate, vinyl laurate, vinyl stearate, vinyl benzoate, etc.

The polyvinyl alcohol-based resin may be unmodified, or it may be a maleic acid-modified polyvinyl alcohol-based resin or other anionic group-modified polyvinyl alcohol-based resin, or cationic group-modified polyvinyl alcohol-based resin.

Considering that its solubility in water will be adjusted, preferably an anionic group-modified polyvinyl alcohol-based resin is adopted. While the anionic group is not limited in any way, it may be carboxyl group, sulfonic acid group, phosphoric acid group, etc., for example.

While the anionic group-modified polyvinyl alcohol-based resin is not limited in any way, it may be a maleic acid-modified polyvinyl alcohol-based resin, itaconic acid-modified polyvinyl alcohol-based resin, acrylic acid-modified polyvinyl alcohol-based resin, methacrylic acid-modified polyvinyl alcohol-based resin, 2-acrylamide-2-methylpropane sulfonic acid-modified polyvinyl alcohol-based resin, etc., for example. Among these, it is preferably a maleic acid-modified polyvinyl alcohol-based resin.

When adopting a modified polyvinyl alcohol-based resin, preferably the ratio of the number of moles in the monomers, etc., that have undergone reaction due to the modification, to the number of moles in all monomers constituting the modified polyvinyl alcohol-based resin (rate of modification), is preferably 10.0 percent by mol or lower, or more preferably 5.0 percent by mol or lower, or yet more preferably 4.0 percent by mol or lower, or even more preferably 2.0 percent by mol or lower.

Additionally, when a modified polyvinyl alcohol-based resin is adopted, the number of moles in the monomers, etc., that have undergone reaction due to the modification, to the number of moles in all monomers constituting the modified polyvinyl alcohol-based resin, is preferably 0.1 percent by mol or higher, or more preferably 1.0 percent by mol or higher, or yet more preferably 1.5 percent by mol or higher.

And, a range of rates of modification can be defined by selecting from these upper limits and lower limits.

The polyvinyl alcohol-based resin used in this embodiment may be such that the polyvinyl alcohol-based resin already contains repeating units consisting of the monomers mentioned below. It should be noted that, of all monomers constituting the polyvinyl alcohol-based resin, the below-mentioned monomers may account for a percentage similar to the percentage accounted for by the aforementioned modification monomers, to the extent that the effects of the present invention are not inhibited.

These monomers include, for example, ethylene, propylene, isobutylene, α-octene, α-dodecene, α-octadecene and other olefins, complete alkyl esters of acrylic acid, methacrylic acid, crotonic acid, maleic acid, maleic acid anhydride, itaconic acid, and other unsaturated acids, acrylonitrile, methacrylonitrile, and other nitriles, acrylamide, methacrylamide, and other amides, alkyl vinyl ethers, N-acrylamide methyltrimethylammonium chloride, allyltrimethylammonium chloride, dimethyldiallylammonium chloride, dimethylallyl vinyl ketone, N-vinyl pyrrolidone, vinyl chloride, vinylidene chloride, polyoxyethylene (meth) allyl ether, polyoxypropylene (meth)allyl ether, and other polyoxyalkylene (meth)allyl ethers, polyoxyethylene (meth) acrylate, polyoxypropylene (meth)acrylate, and other polyoxyalkylene (meth)acrylates, polyoxyethylene (meth)acrylamide, polyoxypropylene (meth)acrylamide, and other polyoxyalkylene (meth)acrylamides, polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, polyoxypropylene vinylamine, diacrylacetone amide, etc.

Furthermore, the aforementioned monomers also include, for example, cationic group-containing monomers, such as N-acrylamide methyltrimethylammonium chloride, N-acrylamide ethyltrimethylammonium chloride, N-acrylamide propyltrimethylammomnium chloride, 2-acryloxyethyltrimethylammonium chloride, 2-methacryloxyethyltrimethyl ammonium chloride, 2-hydroxy-3-methacryloyloxypropyltrimethylammonium chloride, allyltrimethylammonium chloride, methallyltrimethylammonium chloride, 3-butene trimethylammonium chloride, dimethyldiallylammonium chloride, and diethyldiallylammonium chloride.

The average degree of saponification of the polyvinyl alcohol-based resin is not limited in any way. Preferably it is in a range of 70 to 100 percent by mol so as to facilitate the adjustment of the resin's solubility in water, where a more preferred range is 80 to 99 percent by mol, an even more preferred range is 87 to 98 percent by mol, and the most preferred range is 88 to 94 percent by mol.

It should be noted that the aforementioned average degree of saponification is measured according to JIS K6726-1994.

The viscosity of a 4-percent-by-weight aqueous solution of the polyvinyl alcohol-based resin at 20° C. is not limited in any way; however, it is preferably 2.8 to 240 mPa·s, or more preferably 5 to 150 mPa·s, or even more preferably 8 to 50 mPa·s, for example. If the viscosity is within the aforementioned ranges, the film will have particularly good mechanical strength and solubility. It should be noted that the viscosity of a 4-percent-by-weight aqueous solution is measured according to JIS K6726-1994.

The average degree of polymerization of the aforementioned polyvinyl alcohol-based resin is not limited in any way. For example, it is preferably 700 to 2,500, or more preferably 900 to 2,200, or most preferably 1,200 to 2,000. If the average degree of polymerization is within the aforementioned ranges, the viscosity of the resin can be adjusted to an appropriate range when a water-soluble wrapping film is to be formed from it. The aforementioned average degree of polymerization is measured according to JIS K6726-1994.

It should be noted that, when two or more types of polyvinyl alcohol-based resins are combined, the degree of polymerization of the polyvinyl alcohol-based resins as a whole is the weighted average of the degrees of polymerization of the polyvinyl alcohol-based resins based on the ratio by weight of each polyvinyl alcohol-based resin.

Preferably the content of the aforementioned polyvinyl alcohol-based resin in the polyvinyl alcohol-based resin film proposed by the present invention, when it represents 100 percent by weight, is 60 to 97 percent by weight.

If the content of the aforementioned polyvinyl alcohol-based resin is less than the aforementioned 60 percent by weight, the plasticizer, etc., may bleed out of the polyvinyl alcohol-based resin film; if the content exceeds 97 percent by weight, on the other hand, the polyvinyl alcohol-based resin film may not have sufficient strength or flexibility.

Also, keeping the content of the polyvinyl alcohol-based resin within this range facilitates the adjustment of the film's moisture content to an appropriate range.

(B. Plasticizer)

The polyvinyl alcohol-based resin film proposed by the present invention contains a plasticizer.

Polyvinyl alcohol-based resin films are transported, stored and used in hot and humid regions as well as cold places, and must therefore have high tensile strength and durability. Impact resistance at low temperature is also an important consideration. As it contains a plasticizer, the polyvinyl alcohol-based resin film proposed by the present invention can have a lower glass transition point along with improved low-temperature durability and solubility in water. Another outcome of containing a plasticizer is that the polyvinyl alcohol-based resin film will have a lower tensile modulus and thus become flexible.

The aforementioned plasticizer is not limited in any way, and any of generally used plasticizers for polyvinyl alcohol-based resins may be used, including, for example, glycerin, diglycerin, diethylene glycol, trimethylolpropane, triethylene glycol, dipropylene glycol, propylene glycol, and other polyalcohols, polyethylene glycol, polypropylene glycol, and other polyethers, bisphenol A, bisphenol S, and other phenol derivatives, sorbitol and other sugar alcohols, N-methylpyrrolidone and other amide compounds, compounds obtained by adding ethylene oxide to glycerin, pentaerythritol, sorbitol, and other polyalcohols, polyethylene glycol such as PEG400, etc. Any of these may be used alone, or two or more types may be combined.

Among the aforementioned plasticizers, glycerin, diglycerin, sorbitol, trimethylolpropane, polyethylene glycol, polypropylene glycol, triethylene glycol, dipropylene glycol, and propylene glycol are preferred from the viewpoint of improving the resin's solubility in water, while glycerin, diglycerin, sorbitol, trimethylolpropane, and polyethylene glycol such as PEG400 are particularly preferred in that their effect of improving the resin's solubility in water is particularly high.

From the viewpoint of improving the releasability of the film from the surface of the metal roll, etc., i.e., ensuring that its release strength from the surface of the metal roll, etc., is low, and also from the viewpoints of ensuring flexibility of the film as a wrapping material, lowering its adhesion strength on the seal bar and preventing it from blocking, it is more preferable to adopt one or more types selected from glycerin, sorbitol, diglycerin, and polyethylene glycol. Also, when producing a film for heat sealing, it is preferable to adopt one or more types selected from glycerin, diglycerin, sorbitol, and polyethylene glycol from the viewpoint of lowering its adhesion strength on the heat seal bar.

Assume that glycerin and sorbitol are used in combination; in this case, the compounding quantities of glycerin and sorbitol are preferably 1:0.1 to 1:5, or more preferably 1:0.4 to 1:4, based on ratio by weight of glycerin to sorbitol.

It should be noted that this combined use of glycerin and sorbitol is a particularly preferred means for obtaining a polyvinyl alcohol-based resin film according to the solution casting method.

The polyvinyl alcohol-based resin film proposed by the present invention contains the aforementioned plasticizer preferably by 3 to 60 parts by weight, or more preferably by 6 to 55 parts by weight, or yet more preferably by 10 to 45 parts by weight, or even more preferably by 15 to 30 parts by weight, relative to 100 parts by weight of the polyvinyl alcohol-based resin. If the content of the aforementioned plasticizer is less than 3 parts by weight, there won't be any observable effect from compounding the plasticizer. If the compounding percentage of the plasticizer exceeds 60 parts by weight, on the other hand, the plasticizer will bleed out more, and the anti-blocking property of the obtained polyvinyl alcohol-based resin film will worsen.

To lower the adhesion strength of the film on the heat seal bar by selecting only glycerin as a plasticizer, glycerin is compounded by 13 parts by weight or more, or preferably by 16 parts by weight or more, or more preferably by 17 parts by weight or more, relative to 100 parts by weight of the polyvinyl alcohol-based resin.

(C. One or More Types Selected from Sodium Polyoxyethylene Alkyl Ether Acetate, Disodium Polyoxyethylene Alkyl Sulfosuccinate Salt, N-Alkyl-N-Methyl-ß-Alanine Sodium Salt and Sodium Alkane-1,2-Diol Acetate Salt)

(a. Obtain a Polyvinyl Alcohol-Based Resin Film According to a Method of Supplying a Polyvinyl Alcohol-Based Resin Solution to a Metal Roll Surface to Obtain a Film, and, when Using the Obtained Film for Wrapping, Seal its Sealing Parts by Water Sealing)

Preferably the polyvinyl alcohol-based resin film proposed by the present invention contains one or more types selected from sodium polyoxyethylene alkyl ether acetate, disodium polyoxyethylene alkyl sulfosuccinate salt, N-alkyl-N-methyl-ß-alanine sodium salt, and sodium alkane-1,2-diol acetate salt.

Also, sodium polyoxyethylene lauryl ether acetate and/or sodium polyoxyethylene tridecyl ether acetate is/are more preferred among sodium polyoxyethylene alkyl ether acetates, one having an alkyl group with 12 to 14 carbon atoms is more preferred among disodium polyoxyethylene alkyl sulfosuccinate salts, N-lauroyl-N-methyl-ß-alanine sodium salt is more preferred among N-alkyl-N-methyl-ß-alanine sodium salts, and sodium dodecane-1,2-diol acetate salt is more preferred among sodium alkane-1,2-diol acetate salts.

Adopting these compounds will achieve a release strength of the formed film, from the metal roll, of preferably 550 gf/200 mm or lower, or more preferably 300 gf/200 mm or lower, or yet more preferably 200 gf/200 mm or lower, or even more preferably 100 gf/200 mm or lower, thereby facilitating release of the film and also preventing it from sticking to the metal roll surface and tearing, etc., when released.

The measuring conditions for release strength are the same as those according to the release strength measurement method described in "Examples."

Particularly when the film's releasability from the metal roll is to be increased, these compounds are used as surfactants and compounded preferably by 0.03 to 3.00 parts by weight, or more preferably by 0.08 to 1.20 parts by weight, or yet more preferably by 0.15 to 1.00 parts by weight, and most preferably by 0.17 to 0.60 parts by weight, relative to 100 parts by weight of the polyvinyl alcohol.

It should be noted that, for regulatory reasons, surfactants containing phosphorus atoms should not be used.

Also, the obtained polyvinyl alcohol-based resin film, once water-sealed, will have a seal strength of preferably 10.0 N/15 mm or higher, or more preferably 12.0 N/15 mm or higher.

(b. When Using the Polyvinyl Alcohol-Based Resin Film for Wrapping, Seal its Sealing Parts by Heat Sealing)

Preferably the polyvinyl alcohol-based resin film proposed by the present invention contains, among the aforementioned selection of component C, sodium polyoxyethylene alkyl ether acetate and/or disodium polyoxyethylene alkyl sulfosuccinate salt.

Also, sodium polyoxyethylene lauryl ether acetate is more preferred among sodium polyoxyethylene alkyl ether acetates, and one having an alkyl group with 12 to 14 carbon atoms is more preferred among disodium polyoxyethylene alkyl sulfosuccinate salts.

These compounds are used as surfactants and, particularly when the heat sealability is to be maintained, they are compounded by 0.07 to 1.00 parts by weight, or preferably by 0.10 to 0.50 parts by weight, relative to 100 parts by weight of the polyvinyl alcohol.

Adopting these compounds will achieve a release strength of the formed film, from the metal roll, of preferably 550 gf/200 mm or lower, or more preferably 300 gf/200 mm or lower, or yet more preferably 200 gf/200 mm or lower, or even more preferably 100 gf/200 mm or lower, thereby facilitating release of the film and also preventing it from sticking to the metal roll surface and tearing, etc., when released.

The measuring conditions for release strength are the same as those according to the release strength measurement method described in "Examples."

Such composition will lower the adhesion strength of the film on a metal seal bar, etc., meaning that, when the seal bar that has been heated to 150° C. is held in contact with the film under a force of 0.1 MPa for 1 second to seal the film, the film will have an adhesion strength, on the seal bar, of preferably 500 gf/70 mm or lower, or more preferably 400 gf/70 mm or lower, or yet more preferably 350 gf/70 mm or lower, or even more preferably 300 gf/70 mm or lower.

Also, when the seal bar that has been heated to 130° C. is held in contact with the film under a force of 0.35 MPa for 1 second to seal the film, the film will have an adhesion strength, on the seal bar, of preferably 650 gf/70 mm or lower, or more preferably 500 gf/70 mm or lower, or yet more preferably 450 gf/70 mm or lower, or even more preferably 420 gf/70 mm or lower, or most preferably 400 gf/70 mm or lower.

Furthermore, in addition to the adhesion strength on the seal bar, the polyvinyl alcohol-based resin film will have a seal strength of preferably 6.0 N/15 mm or higher, or more preferably 7.0 N/15 mm or higher, or yet more preferably 10.0 N/15 mm or higher, when pieces of it are heat-sealed with the seal bar that has been heated to 150° C., under a force of 0.2 MPa for 1 second.

(D. Alkali Metal Salt of Fatty Acid Having 6 to 22 Carbon Atoms)

Under the present invention, the effect of preventing the polyvinyl alcohol-based resin film from adhering to the metal seal bar, etc., when heat-sealed, can also be achieved by the presence of an alkali metal salt of fatty acid.

When the polyvinyl alcohol-based resin film is obtained by the solution casting method, an alkali metal salt of fatty acid having 6 to 22 carbon atoms may be contained. Particularly when the polyvinyl alcohol-based resin film is to be used in heat sealing applications, this alkali metal salt of fatty acid having 6 to 22 carbon atoms is compounded, on a case-by-case basis, to lower the adhesion strength of the film on the seal bar and also improve its heat seal strength.

When an alkali metal salt of fatty acid having 6 to 22 carbon atoms is to be compounded, the content of the aforementioned alkali metal salt of fatty acid is preferably 0.03 to 3.00 parts by weight, or more preferably 0.10 to 2.00 parts by weight, or yet more preferably 0.20 to 1.50 parts by weight, or even more preferably 0.30 to 1.00 parts by weight, relative to 100 parts by weight of the polyvinyl alcohol-based resin proposed by the present invention.

The alkali metal salt of fatty acid having 6 to 22 carbon atoms under the present invention is not limited in any way, but preferably it is, for example, a sodium or potassium salt of caproic acid, caprylic acid, capric acid, lauric acid, myristic acid, palmitic acid, stearic acid, behenic acid or other aliphatic carboxylic acid.

If the content of the aforementioned alkali metal salt is less than 0.03 parts by weight, the effect of preventing the polyvinyl alcohol-based resin film from adhering to the metal seal bar, etc., when heat-sealed, may become insufficient, or the unwinding tension and blocking strength of the wound polyvinyl alcohol-based resin film may become excessively high, while a content exceeding 3.00 parts by weight will cause the film's appearance to deteriorate.

One or two or more types of these alkali metal salts of fatty acids may be used. Particularly when the film is to be used for heat sealing, preferably an alkali metal salt of fatty acid having 6 to 22 carbon atoms is used, where, for example, adopting an alkali metal salt of fatty acid having 6 to 14 carbon atoms can improve both the effect of lowering the film's adhesion strength on the seal bar and the effect of preventing the surfaces of the polyvinyl alcohol-based resin film from blocking to each other, and adopting an alkali metal salt of fatty acid having 12 carbon atoms is most preferred.

If the alkali metal salt of fatty acid has greater than 22 carbon atoms, or if an alkali metal salt of fatty acid having less than 6 carbon atoms or alkali earth metal salt of fatty acid, instead of alkali metal salt of fatty acid, is adopted, there are higher chances that the polyvinyl alcohol-based resin film will have a mottled appearance or an excessively high blocking strength. Particularly when the film is obtained by the solution casting method, preferably an alkali metal salt of fatty acid having 6 to 22 carbon atoms is adopted.

It should be noted that, although a fatty acid salt or free organic acid other than alkali metal salt can be compounded, compounding such fatty acid salt or free acid may impair the effects that would otherwise be achieved by compounding a specific alkali metal salt of fatty acid, and therefore such fatty acid salt or free acid may be compounded only to the extent that the effects of the present invention are not impaired. It should be noted that, for regulatory reasons, surfactants containing phosphorus atoms should not be compounded.

Also, when the polyvinyl alcohol-based resin film is to be used in the manufacturing of wrapped bodies not by heat sealing, but by sealing by water or aqueous solvent, an alkali metal salt of fatty acid having 6 to 22 carbon atoms may be adopted as one to be used. Furthermore, when the number of carbon atoms in the alkali metal salt of fatty acid is 6 to 14, both improved anti-blocking property and lower unwinding tension can be achieved.

(E. Filler)

The polyvinyl alcohol-based resin film proposed by the present invention may or may not contain silica, calcium carbonate, starch, talc, aluminosilicate salt, or other filler. When it contains such filler, the polyvinyl alcohol-based resin film will have higher surface roughness and lower gloss, and therefore lower blocking strength and lower unwinding tension of the roll, which allows for smooth unwinding of the film from a securely rolled state.

When a filler is compounded, its compounding quantity is 0.5 to 10 parts by weight relative to 100 parts by weight of the polyvinyl alcohol-based resin. If it is less than 0.5 parts by weight, the effect from compounding the filler may not be sufficient, while if it exceeds 10 parts by weight, the flexibility and heat sealability of the polyvinyl alcohol-based resin film may be impaired.

The thickness of the polyvinyl alcohol-based resin film proposed by the present invention is 25 to 100 µm, or preferably 28 to 90 µm. If it is less than 25 µm, the film cannot have sufficient strength, while if it exceeds 100 µm, the ease of packaging or process efficiency of heat sealing may be lowered when the film is heat-sealed for wrapping, etc.

A preferred moisture content is 2.0 to 10.0 percent by weight, but the moisture content is more preferably 2.5 to 9.0 percent by weight, or most preferably 3.0 to 8.0 percent by weight.

(F. Deposition of Powder)

The polyvinyl alcohol-based resin film proposed by the present invention can be coated, and adhered to, by a powder at least on one side. The powder, which may be a starch, talc, mica, calcium carbonate, or other powder, can increase the surface roughness of the polyvinyl alcohol-based resin film while lowering its gloss, to prevent pieces of the polyvinyl alcohol-based resin film from blocking to each other and lower its roll unwinding tension.

When the film is coated with a powder, its adhered quantity is 0.02 to 0.20 $g/m^2$, or preferably 0.03 to 0.20 $g/m^2$. If it is less than 0.02 $g/m^2$, sufficient effect cannot be demonstrated from coating and deposition of the powder, while even if it exceeds 0.20 $g/m^2$, the effect from applying and depositing the powder cannot be further exhibited, and also the wrapping environment may be contaminated due to excess powder falling from the film.

Into the polyvinyl alcohol-based resin film proposed by the present invention, if necessary, standard additives such as colorant, flavoring agent, extenders, defoamers, release agent, Ultraviolet absorbers, surfactant, and aversive agent may further be compounded as deemed appropriate. A surfactant, other than surfactant containing phosphorus atoms, may be compounded at a ratio of 0.01 to 5 parts by weight relative to 100 parts by weight of the polyvinyl alcohol-based resin.

It should be noted, however, that the polyvinyl alcohol-based resin film proposed by the present invention does not contain any alkali metal salt of dibasic acid or alkali earth metal salt of fatty acid.

The polyvinyl alcohol-based resin film may or may not have minute irregularities formed on its surface by means of embossing. The polyvinyl alcohol-based resin film may be opaque or transparent, and the film may be made transparent by adding an inorganic pigment or extender pigment by less than 30 parts by weight, or titanium oxide, which is a pigment having excellent concealability, may be added by less than 10 parts by weight or less than 8 parts by weight, relative to 100 parts by weight of the polyvinyl alcohol-based resin. In the case of an opaque polyvinyl alcohol-based resin film, an arbitrary pigment may be added as necessary to the extent that the effects of the present invention are not impaired. Also, it may or may not contain one of acrylic-based resin, liquid paraffin, sugar alcohol, and dipropylene glycol.

<Method for Manufacturing Polyvinyl Alcohol-Based Resin Film>

As for the method for manufacturing the polyvinyl alcohol-based resin film proposed by the present invention, a method is adopted whereby an aqueous solution or aqueous solvent solution of a composition of polyvinyl alcohol-based resin film is supplied to the surface of a metal roll, etc. (including the surface of a metal belt) which is a support member that uses any known device and rotating, and as the solution dries, the resulting film is released from the surface of the metal roll, etc. (including the surface of the metal belt), and taken up.

It should be noted that, as for the method for supplying the solution as mentioned above, the solution casting method (cast method), roll coating method, or other known method may be adopted.

The aforementioned support member can, when the aqueous solution containing the polyvinyl alcohol-based resin, etc., is cast, maintain this aqueous solution on the surface (cast face) of the support member, while also supporting the polyvinyl alcohol-based resin film to be obtained. Additionally, it is necessary that the dried film can be released from the support member. The material for the aforementioned support member may be, for example, metal, polyolefin, polyester or acrylic resin, urethane resin, epoxy resin, etc. A support member made of other material may be used. The aforementioned polyolefin may be ethylene, polypropylene, ethylene-vinyl acetate copolymer, ethylene-vinyl alcohol copolymer, etc. The aforementioned polyester may be polyethylene terephthalate, polyethylene naphthalate, etc. Preferably the material for the aforementioned support member is not a polyvinyl alcohol-based resin.

It should be noted, however, that preferably a metal roll or metal belt having an iron, chrome-plated, aluminum, or other surface, in particular, is used as the support member.

The method for drying the aforementioned aqueous solution of polyvinyl alcohol-based resin that has been cast, etc., onto the aforementioned support member, is not limited in any way and any method may be used as deemed appropriate. The drying method may be a method that involves natural drying, a method that involves drying by heating, or the like. The face of the drying support member on the side in direct contact with the air, not the surface (cast face) side, is called the air face.

The polyvinyl alcohol-based resin film proposed by the present invention is obtained by releasing the aforementioned cast solution from the support member at an arbitrary timing before or after drying.

The polyvinyl alcohol-based resin film obtained by adopting a method of casting, etc., and then drying an aqueous solution on a support member, is such that the surface of the polyvinyl alcohol-based resin film can have excellent smoothness or minute irregularities according to the surface property of the support member. Furthermore, the wrapping target may be a liquid, powder, or tablet or other solid matter. Also, for the polyvinyl alcohol-based resin film obtained by this method, among the alkali metal salts of fatty acids cited in the present invention, preferably one having 6 to 22 carbon atoms, or more preferably one having 6 to 14 carbon atoms, is used so that the anti-blocking property of the polyvinyl alcohol-based resin film can be improved.

Also, if the polyvinyl alcohol-based resin film is obtained by casting an aqueous solution, preferably glycerin and/or sorbitol is/are selected as a plasticizer(s) for use in the present invention. By selecting such plasticizer(s), and also because of its/their interaction with the alkali metal salt of fatty acid, a polyvinyl alcohol-based resin film which is excellent, particularly in terms of low adhesion strength on metal seal bars, etc., can be obtained.

Furthermore, when the polyvinyl alcohol-based resin film is obtained by casting an aqueous solution, a filler may or may not be compounded, and to the extent that the effects of the present invention are not impaired, a surfactant containing phosphorus atoms may or may not be compounded and a powder may or may not be deposited.

The polyvinyl alcohol-based resin film proposed by the present invention may be formed by one layer alone, or it may comprise a stack of two or more layers having the composition of polyvinyl alcohol-based resin film cited in the present invention.

Purposes of use of the aforementioned polyvinyl alcohol-based resin film include, for example, chemical-agent wrapping films for use in wrapping detergents, agricultural chemicals, pharmaceutical agents, and other chemical agents. Dosage forms include powder, solid, gel, liquid, etc.

EXAMPLES

<Method for Producing Polyvinyl Alcohol (PVA)-Based Resin Film>

A. Preparation of Metal Roll

A chrome-plated metal roll was used.

1. Wiped the surface of the metal roll using a cloth moistened with water.

2. Wiped the surface of the metal roll twice using a lab towel (manufactured by Unichemy Co., Ltd.) moistened with methanol.

B. Conditions for Producing Water-Soluble Film

Surface temperature of metal roll: 70 to 90° C.

Viscosity of aqueous solution of polyvinyl alcohol-based resin, etc.: 2,000 to 5,000 mPa·s (measured value at 85° C., measured with a Type B viscometer)

Film thickness: 75 μm

Moisture content of film: 2 to 5 percent by weight

1. Cast the aqueous solution of polyvinyl alcohol-based resin on the metal roll in such a way that the TD (transverse direction) width of the film became 200 mm.

2. Dried the film for a prescribed period of time while rotating the metal roll until the moisture content of the film became 2 to 5 percent by weight.

3. Stopped the metal roll.

<Method for Measuring Release Strength>

1. Peeled the 200-mm wide film from the surface of the metal roll by around 10 mm in the MD (machine direction), and installed a force gauge (DS2-50N, manufactured by Imada Co., Ltd.).

2. Peeled the film in the MD by at least 200 mm at 800 mm/min by making sure the surface of the metal roll remained at right angles with the MD of the peeled film.

The corresponding release strength (gf/200 mm) was measured, and the average value was obtained.

At the same time, the appearance of the released film was checked.

As for the appearance of the film, "◯" was given when the visual inspection found no wrinkles, scratches, tears, or other problems, and "x" was given when these problems occurred.

<Method for Measuring Moisture Content (Moisture Content Measured at Sealing)>

The moisture content of the polyvinyl alcohol-based resin film was measured using a Karl Fischer moisture measuring device (AQV-22005, manufactured by Hiranuma Sangyo Co., Ltd.).

<Method for Measuring Water Seal Strength>

Water was applied on an A4-size piece of the polyvinyl alcohol-based resin film using a lab towel (manufactured by Unichemy Co., Ltd.) moistened with water, until the applied quantity of water reached 35 to 50 g/m².

The film on which water had been applied was immediately placed on top of another piece of the film on which water had not been applied, and the film pieces were pressure-bonded together by rolling a 1.5-kg aluminum roller three times over them.

The water-sealed part of the bonded pieces of the polyvinyl alcohol-based resin film was cut to a width of 15 mm, and its maximum strength (N/15 mm) was measured using a tensile tester (AGS-1 kN, manufactured by Shimadzu Corporation).

Speed of tensile test: 300 mm/min

When two pieces each of the polyvinyl alcohol-based resin films in the Examples and Comparative Examples were water-sealed together according to the aforementioned method, all polyvinyl alcohol-based resin films had a seal strength of 15 to 27 N/15 mm.

<Method for Measuring Heat Seal Strength 1>

Two pieces of the 70-mm wide polyvinyl alcohol-based resin film were placed on top of each other and heat-sealed using a heat seal tester (TP-701B, manufactured by Tester Sangyo Co., Ltd.). The obtained result is defined as heat seal strength 1.

Top sealing member: 10-mm wide, Teflon-coated (Teflon is a registered trademark) aluminum seal bar, 150° C.

Bottom sealing member: Made of rubber, Teflon-taped (Teflon is a registered trademark), 30° C.

Sealing time: 1 sec

Sealing pressure: 0.2 MPa

The resulting heat-sealed part was cut to a width of 15 mm, and its maximum strength was measured using a tensile tester (AGS-1 kN, manufactured by Shimadzu Corporation).

Speed of tensile test: 300 mm/min

Two pieces each of the polyvinyl alcohol-based resin films in the Examples and Comparative Examples were heat-sealed together according to the aforementioned method.

<Method for Measuring Heat Seal Strength 2>

Heat sealing was performed according to the aforementioned method for measuring heat seal strength 1, except that the seal bar used as the top sealing member was changed to an aluminum seal bar without Teflon coating, but without changing any of the remaining conditions. The obtained result is defined as heat seal strength 2.

Two pieces each of the polyvinyl alcohol-based resin films in the Examples and Comparative Examples were heat-sealed together according to the aforementioned method.

<Method for Measuring Seal Bar Adhesion Strength 1 (150° C. Seal Bar)>

The polyvinyl alcohol-based resin film was measured for seal bar adhesion strength per 70 mm of width using a heat seal tester (TP-701B, manufactured by Tester Sangyo Co., Ltd.) and a digital force gauge (DS2-50N, manufactured by Imada Co., Ltd.).

Preparation of Heat Seal Tester

1) Prior to heat sealing, the top aluminum seal bar was polished 10 times using a sandpaper of granularity #1000.

2) Furthermore, the top aluminum seal bar was wiped 10 times using a lab towel (manufactured by Unichemy Co., Ltd.) moistened with methanol. This test preparation was performed every time the film composition to be tested was changed.

Heat Sealing Conditions

Top sealing member: 10-mm wide aluminum seal bar; pressed for 1 second under a force of 0.1 MPa at 150° C.

Bottom sealing member: Made of rubber, Teflon-taped (Teflon is a registered trademark), 30° C.

Seal Bar Adhesion Strength

Two pieces of the film of the composition to be tested were heat-sealed together 10 times successively at different locations, after which a new film piece of 70 mm in width was prepared and heat-sealed thereon, to produce a heat-sealed part which was 10 mm long×70 mm wide. At this point, the heat-sealed part on one end of the film was adhering to the seal bar. Thereafter, the other end that was not heat-sealed was pinched with a clip and the tip of the digital force gauge was hooked onto the clip, and then the digital force gauge was pulled in the lateral direction in an attempt to peel the heat-sealed part from the seal bar, to measure the maximum strength needed for the heat-sealed part to peel from the seal bar.

Here, the two pieces of the 70-mm wide polyvinyl alcohol-based resin film were placed on top of each other in such a way that, if the film was formed by the solution casting method, their air faces would both face the inner side.

<Method for Measuring Seal Bar Adhesion Strength 2 (130° C. Seal Bar)>

Seal bar adhesion strength 2 was measured according to the aforementioned method for measuring seal bar adhesion strength 1 under the same conditions, except that, among the heat sealing conditions, the top sealing member was pressed for 1 second under a force of 0.35 MPa at 130° C.

The lower the seal bar adhesion strength, the more reliably the polyvinyl alcohol-based resin film can be released from a metal seal bar, etc., during actual heat sealing due to the shearing force that generates between the surface of the metal seal bar, etc., and the surface of the polyvinyl alcohol-based resin film as the polyvinyl alcohol-based resin film moves.

The materials used in the Examples and Comparative Examples are as follows:

A-1: Maleic acid-modified polyvinyl alcohol, average degree of polymerization 1,700, average degree of saponification 89 percent by mol, rate of modification 1.9 percent by mol A-2: Maleic acid-modified polyvinyl alcohol, average degree of polymerization 1,000, average degree of saponification 89 percent by mol, rate of modification 1.9 percent by mol A-3: Maleic acid-modified polyvinyl alcohol, average degree of polymerization 1,700, average degree of saponification 94 percent by mol, rate of modification 1.9 percent by mol A-4: Maleic acid-modified polyvinyl alcohol, average degree of polymerization 1,700, average degree of saponification 97 percent by mol, rate of modification 1.9 percent by mol A-5: Maleic acid-modified polyvinyl alcohol, average degree of polymerization 1,700, average degree of saponification 95 percent by mol, rate of modification 3.6 percent by mol A-6: Unmodified polyvinyl alcohol, average degree of polymerization 1,000, average degree of saponification 88 percent by mol
B-1: Glycerin
B-2: Sorbitol
B-3: Diglycerin
B-4: PEG400 (Polyethylene glycol, average degree of polymerization 400)
C-1: Sodium polyoxyethylene lauryl ether acetate
C-2: Sodium polyoxyethylene tridecyl ether acetate
C-3: Disodium polyoxyethylene alkyl sulfosuccinate salt
C-4: N-lauroyl-N-methyl-ß-alanine sodium salt
C-5: Sodium dodecane-1,2-diol acetate salt
C-6: Metal salt of polyoxyethylene secondary alkyl ether phosphate
C-7: Disodium alkyl sulfosuccinate salt
C-8: Sodium di-2-ethylhexyl sulfosuccinate: Dioctyl sulfosuccinate
C-9: Sodium alkane sulfonate
C-10: Polyoxyethylene alkyl ether sulfate salt
C-11: Polyoxyethylene lauryl ether
C-12: Lauramidopropyl dimethylaminoacetate betaine
C-13: Polyoxyethylene (repeating units: 10) octylphenyl ether
E-1: Silica, average particle size 4.7 μm, apparent specific gravity 0.26 mg/ml Examples and Comparative Examples Aqueous solutions of resin compositions were obtained by adding a polyvinyl alcohol-based resin (A), a plasticizer (B), a surfactant (C), a fatty acid (D), a filler (E), and/or water according to each of the compositions shown in Tables 1 and 2 below. Using these aqueous solutions, polyvinyl alcohol-based resin films of 75 μm in thickness were formed based on the aforementioned method for producing a water-soluble film.

The aforementioned tests were conducted on the obtained films, and the results are shown in Tables 1 and 2.

It should be noted that the Examples followed by a number represent examples of films demonstrating primarily excellent releasability from the metal roll surface and water sealability, while the Examples followed by a letter represent examples of films demonstrating primarily excellent releasability from the metal roll surface and water sealability, as well as excellent heat sealability and releasability from the seal bar (heat seal bar). The diagonal strokes in the tables indicate that the items were not measured.

TABLE 1

| | Composition of water-soluble film | | | | | | Release strength from metal roll | | Performance of water-soluble film | |
|---|---|---|---|---|---|---|---|---|---|---|
| | | | | | D | E | | | | Water |
| | Thickness (μm) | A (parts by weight) | B (parts by weight) | C Surfactant (parts by weight) | Fatty acid | Additive quantity (parts by weight) | Additive quantity (parts by weight) | Release strength (gf/200 mm) | Appearance of film | Moisture content (% by weight) | seal strength (N/15 mm) |
| Example 1 | 75 | A-1(100) | B-1(21) | C-1(0.5) | None | 0 | | 50 | ○ | 6.5 | 21 |
| Example 2 | | | | C-1(0.1) | None | 0 | | 550 | ○ | 6.5 | 19 |
| Example 3 | | | | C-2(0.3) | None | 0 | | 90 | ○ | 6.5 | 18 |
| Example 4 | | | | C-3(0.3) | None | 0 | | 60 | ○ | 6.2 | 22 |
| Example 5 | | | | C-3(0.1) | None | 0 | | 550 | ○ | 6.0 | 22 |
| Example 6 | | | | C-5(0.3) | None | 0 | | 100 | ○ | 6.0 | 21 |
| Comparative Example 1 | | | | C-6(0.3) | None | 0 | | 60 | ○ | 5.5 | 21 |
| Comparative Example 2 | | | | C-7(0.3) | None | 0 | | 450 | X | | |
| Example A | | | | C-3(0.3) | Sodium laurate | 0.4 | | 60 | ○ | 5.7 | 19 |
| Example B | | | | C-3(0.3) | Sodium laurate | 0.8 | | 60 | ○ | 5.5 | 18 |
| Example C | | | | C-3(0.3) | Sodium stearate | 0.4 | | 60 | ○ | 6.9 | 20 |
| Example D | | | B-1(40) | C-3(0.3) | Sodium laurate | 0.4 | | 60 | ○ | 5.9 | 17 |
| Example E | | | B-1(15) B-2(15) | C-3(0.3) | Sodium laurate | 0.4 | | 60 | ○ | 6.0 | 20 |
| Example 7 | | | B-3(21) | C-1(0.5) | None | 0 | | 40 | ○ | 6.5 | 27 |
| Example H | | | B-1(11) B-4(10) | C-3(0.3) | Sodium laurate | 0.4 | | 100 | ○ | 6.8 | 20 |
| Example 8 | | A-1(40) | B-1(16) | C-1(1.0) | None | 0 | | 40 | ○ | 6.5 | 25 |
| Example 9 | | A-2(60) | | C-1(0.5) | None | 0 | | 60 | ○ | 7.0 | 21 |
| Example 10 | | | | C-1(0.1) | None | 0 | | 320 | ○ | 7.8 | 23 |
| Example 11 | | | | C-3(0.5) | None | 0 | | 60 | ○ | 7.3 | 16 |
| Example 12 | | | | C-3(0.2) | None | 0 | | 60 | ○ | 7.6 | 16 |
| Example 13 | | | | C-4(0.5) | None | 0 | | 180 | ○ | 6.8 | 18 |
| Comparative Example 3 | | | | C-6(0.3) | None | 0 | | 60 | ○ | 7.3 | 19 |
| Comparative Example 4 | | | | C-8(0.5) | None | 0 | | 1900 | ○ | 7.5 | 18 |
| Comparative Example 5 | | | | C-9(0.5) | None | 0 | | 700 | ○ | 7.2 | 16 |
| Comparative Example 6 | | | | C-10(0.5) | None | 0 | | 850 | ○ | 7.7 | 16 |
| Comparative Example 7 | | | | C-11(0.5) | None | 0 | | 900 | ○ | 7.9 | 16 |

TABLE 1-continued

| | Composition of water-soluble film | | | | | | Release strength from metal roll | | Performance of water-soluble film | |
|---|---|---|---|---|---|---|---|---|---|---|
| | | | | | D | E | | | | |
| | Thick-ness (μm) | A (parts by weight) | B (parts by weight) | C Surfactant (parts by weight) | Fatty acid | Additive quantity (parts by weight) | Additive quantity (parts by weight) | Release strength (gf/200 mm) | Appearance of film | Moisture content (% by weight) | Water seal strength (N/15 mm) |
| Comparative Example 8 | | | | C-12(0.5) | None | 0 | | 1900 | ○ | 7.5 | 16 |
| Comparative Example 9 | | | | C-13(1.2) | None | 0 | | 700 | ○ | 6.8 | 18 |
| Comparative Example 10 | | | | None | None | 0 | | 2800 | X | 5.8 | 20 |
| Example F | | | | C-3(0.1) | Sodium laurate | 0.4 | | 60 | ○ | 5.4 | 18 |
| Example G | | | | C-1(0.3) | Sodium laurate | 0.4 | | 60 | ○ | 4.7 | 21 |
| Example 14 | | | B-1(5) | C-1(0.5) | None | 0 | | 60 | ○ | 5.5 | 24 |
| Example 15 | | | B-1(40) | C-1(0.5) | None | 0 | | 50 | ○ | 5.9 | 15 |
| Example 16 | | | B-2(16) | C-1(0.5) | None | 0 | | 70 | ○ | 6.5 | 16 |
| Example 17 | | | B-1(7) B-2(23) | C-1(0.5) | None | 0 | | 60 | ○ | 6.3 | 18 |
| Example I | | A-3(100) | B-1(28) | C-1(0.5) | None | 0 | | 70 | ○ | 7.0 | 21 |
| Example J | | | | C-1(0.2) C-3(0.1) | None | 0 | | 60 | ○ | 6.7 | 22 |
| Example K | | | | C-3(0.3) | Sodium laurate | 0.4 | | 60 | ○ | 6.9 | 20 |
| Comparative Example 11 | | | | C-6(0.3) | None | 0 | | 60 | ○ | 6.7 | 21 |
| Example L | | A-4(100) | B-1(30) | C-1(0.5) | None | 0 | | 70 | ○ | 7.3 | 20 |
| Example 18 | | A-5(100) | B-1(21) | C-1(0.5) | None | 0 | | 60 | ○ | 6.8 | 20 |
| Example 19 | | | B-1(30) B-2(15) | C-1(0.5) | None | 0 | E-1(6) | 70 | ○ | 7.0 | 21 |
| Example M | | | B-1(30) B-2(15) | C-3(0.3) | Sodium laurate | 0.4 | E-1(6) | 70 | ○ | 7.0 | 20 |
| Example 20 | | A-3(60) A-6(40) | B-1(21) | C-1(0.5) | None | 0 | | 50 | ○ | 6.9 | 18 |

TABLE 2

| | Composition of water-soluble film | | | | | | Performance of water-soluble film | | | |
|---|---|---|---|---|---|---|---|---|---|---|
| | | | | | D | E | | Heat | Heat | Seal bar | Seal bar |
| | Thick-ness (μm) | A (parts by weight) | B (parts by weight) | C Surfactant (parts by weight) | Fatty acid | Additive quantity (parts by weight) | Additive quantity (parts by weight) | Moisture content (% by weight) | seal strength 1 (N/15 mm) | seal strength 2 (N/15 mm) | adhesion strength 1 (gf/70 mm) | adhesion strength 2 (gf/70 mm) |
| Example 1 | 75 | A-1(100) | B-1(21) | C-1(0.5) | None | 0 | | 6.5 | 9.5 | 9.9 | | 1170 |
| Example 2 | | | | C-1(0.1) | None | 0 | | 6.5 | 8.7 | | | 1200 |
| Example 3 | | | | C-2(0.3) | None | 0 | | 6.5 | 12.1 | | | 1200 |
| Example 4 | | | | C-3(0.3) | None | 0 | | 6.2 | 1.5 | | | 1000 |
| Example 5 | | | | C-3(0.1) | None | 0 | | 6.0 | 12.3 | | | 1100 |
| Example 6 | | | | C-5(0.3) | None | 0 | | 6.0 | 11.5 | | | 1740 |
| Comparative Example 1 | | | | C-6(0.3) | None | 0 | | 5.5 | 11.2 | | 280 | 450 |
| Comparative Example 2 | | | | C-7(0.3) | None | 0 | | | | | | |
| Example A | | | | C-3(0.3) | Sodium laurate | 0.4 | | 5.7 | 12.7 | | 340 | 400 |
| Example B | | | | C-3(0.3) | Sodium laurate | 0.8 | | 5.5 | 11.1 | | 400 | 220 |
| Example C | | | | C-3(0.3) | Sodium stearate | 0.4 | | 6.9 | 12.0 | | 280 | 400 |
| Example D | | | B-1(40) | C-3(0.3) | Sodium laurate | 0.4 | | 5.9 | 8.6 | | | 540 |
| Example E | | | B-1(15) B-2(15) | C-3(0.3) | Sodium laurate | 0.4 | | 6.0 | 8.9 | | 770 | 630 |
| Example 7 | | | B-3(21) | C-1(0.5) | None | 0 | | 6.5 | 8.5 | | | 1200 |
| Example H | | | B-1(11) B-4(10) | C-3(0.3) | Sodium laurate | 0.4 | | 6.8 | 8.1 | | 300 | 370 |
| Example 8 | | A-1(40) | B-1(16) | C-1(1.0) | None | 0 | | 6.5 | 0.9 | | | 730 |
| Example 9 | | A-2(60) | | C-1(0.5) | None | 0 | | 7.0 | 11.6 | 10.6 | 1050 | 920 |

TABLE 2-continued

| | Composition of water-soluble film | | | | | | Performance of water-soluble film | | | | |
|---|---|---|---|---|---|---|---|---|---|---|---|
| | | | | | D | E | | Heat | Heat | Seal bar | Seal bar |
| | Thickness (μm) | A (parts by weight) | B (parts by weight) | C Surfactant (parts by weight) | Fatty acid | Additive quantity (parts by weight) | Additive quantity (parts by weight) | Moisture content (% by weight) | seal strength 1 (N/15 mm) | seal strength 2 (N/15 mm) | adhesion strength 1 (gf/70 mm) | adhesion strength 2 (gf/70 mm) |
| Example 10 | | | | C-1(0.1) | None | 0 | | 7.8 | 10.7 | | | 960 |
| Example 11 | | | | C-3(0.5) | None | 0 | | 7.3 | 0.5 | | | 940 |
| Example 12 | | | | C-3(0.2) | None | 0 | | 7.6 | 1.5 | | | 900 |
| Example 13 | | | | C-4(0.5) | None | 0 | | 6.8 | 14.5 | | | 1360 |
| Comparative Example 3 | | | | C-6(0.3) | None | 0 | | 7.3 | 12.1 | | 320 | 370 |
| Comparative Example 4 | | | | C-8(0.5) | None | 0 | | 7.5 | 12.5 | | | 1230 |
| Comparative Example 5 | | | | C-9(0.5) | None | 0 | | 7.2 | 8.1 | | | 1370 |
| Comparative Example 6 | | | | C-10(0.5) | None | 0 | | 7.7 | 1.0 | | | 1080 |
| Comparative Example 7 | | | | C-11(0.5) | None | 0 | | 7.9 | 7.5 | | | 850 |
| Comparative Example 8 | | | | C-12(0.5) | None | 0 | | 7.5 | 13.4 | | | 1160 |
| Comparative Example 9 | | | | C-13(1.2) | None | 0 | | 6.8 | 5.8 | 15.6 | | 390 |
| Comparative Example 10 | | | | None | None | 0 | | 5.8 | 10.1 | | 1280 | 1970 |
| Example F | | | | C-3(0.1) | Sodium laurate | 0.4 | | 5.4 | 12.4 | | 320 | 380 |
| Example G | | | | C-1(0.3) | Sodium laurate | 0.4 | | 4.7 | 8.5 | | 470 | 400 |
| Example 14 | | | B-1(5) | C-1(0.5) | None | 0 | | 5.5 | 0.2 | | | 1250 |
| Example 15 | | | B-1(40) | C-1(0.5) | None | 0 | | 5.9 | 8.6 | 8.7 | | 970 |
| Example 16 | | | B-2(16) | C-1(0.5) | None | 0 | | 6.5 | 0.3 | 8.5 | | 1000 |
| Example 17 | | | B-1(7) B-2(23) | C-1(0.5) | None | 0 | | 6.3 | 1.0 | | | 1030 |
| Example I | | A-3(100) | B-1(28) | C-1(0.5) | None | 0 | | 7.0 | 3.1 | 12.0 | 270 | |
| Example J | | | | C-1(0.2) C-3(0.1) | None | 0 | | 6.7 | 3.1 | 15.1 | 320 | |
| Example K | | | | C-3(0.3) | Sodium laurate | 0.4 | | 6.9 | 9.4 | 17.8 | 280 | |
| Comparative Example 11 | | | | C-6(0.3) | None | 0 | | 6.7 | 4.2 | 16.8 | 250 | |
| Example L | | A-4(100) | B-1(30) | C-1(0.5) | None | 0 | | 7.3 | 1.3 | 12.6 | 180 | |
| Example 18 | | A-5(100) | B-1(21) | C-1(0.5) | None | 0 | | 6.8 | 7.7 | | | 740 |
| Example 19 | | | B-1(30) B-2(15) | C-1(0.5) | None | 0 | E-1(6) | 7.0 | 10.1 | | | 810 |
| Example M | | | B-1(30) B-2(15) | C-3(0.3) | Sodium laurate | 0.4 | E-1(6) | 7.0 | 9.6 | | | 410 |
| Example 20 | | A-2(60) A-6(40) | B-1(21) | C-1(0.5) | None | 0 | | 6.9 | 7.1 | | | 780 |

Examples 1 to 20 do not use any surfactant containing phosphorus atoms and thus are not subject to regulatory constraints, and these films also had low release strength from the metal roll and thus could be released more smoothly when formed and the released films had no surface flaws. Additionally, they could achieve sufficient water sealability when water-sealed.

Examples A to M achieved appropriate heat seal strength in addition to effects similar to those achieved by Examples 1 to 20, and these films also had low adhesion strength on the heat seal bar and thus did not stick strongly to the heat seal bar during heat sealing. As a result, these films could be heat-sealed without fail and did not tear during heat sealing.

Also, the films in Examples A to M can be used for water sealing and heat sealing. Based on their heat seal strength 2, the films in Examples 16, I, J, and L are confirmed to have sufficient heat seal strength.

By contrast, Comparative Examples 1, 3 and 11, although being low in release strength from the metal roll and adhesion strength on the heat seal bar, and high in water seal strength and heat seal strength, may be subject to use restrictions because they contain a phosphorus compound as a surfactant.

Comparative Example 2 is an example where disodium alkyl sulfosuccinate salt was used as a surfactant. As a result, the film released from the metal roll had very poor appearance and, because the film also stretched, it was difficult to test.

Comparative Examples 4 to 8 used a surfactant different from those cited in the present invention. Accordingly, their release strength from the metal roll and adhesion strength on the heat seal bar were high.

Comparative Example 9 used a surfactant different from those cited in the present invention. Accordingly, its release strength from the metal roll was high.

Comparative Example 10 did not use any surfactant. This led to high release strength from the metal roll, as well as poor appearance due to knock lines, etc., formed during release. It should be noted that, while various tests could be conducted on the film, its adhesion strength on the heat seal bar was high.

What is claimed is:

1. An anionic group-modified polyvinyl alcohol-based water-soluble resin film containing components A to C below:
   A. an anionic group-modified polyvinyl alcohol-based resin;
   B. one or more components selected from glycerin, sorbitol, polyethylene glycol, and diglycerin; and
   C. one or more components selected from sodium polyoxyethylene alkyl ether acetate, disodium polyoxyethylene alkyl sulfosuccinate salt, N-alkyl-N-methyl-ß-alanine sodium salt, and sodium alkane-1,2-diol acetate salt.

2. The anionic group-modified polyvinyl alcohol-based water-soluble resin film according to claim 1, wherein component C comprises one or more components selected from sodium polyoxyethylene lauryl ether acetate, sodium polyoxyethylene tridecyl ether acetate, disodium polyoxyethylene alkyl sulfosuccinate salt, N-lauroyl-N-methyl-ß-alanine sodium salt, and sodium dodecane-1,2-diol acetate salt.

3. The anionic group-modified polyvinyl alcohol-based water-soluble resin film according to claim 1, wherein an alkali metal salt of fatty acid having 6 to 22 carbon atoms is contained as component D.

4. The anionic group-modified polyvinyl alcohol-based water-soluble resin film according to claim 1, obtained by coating on a metal roll an aqueous solution of anionic group-modified polyvinyl alcohol-based resin free from phosphorus atom-containing surfactant, drying the solution, and then releasing the resulting film from the metal roll, wherein a release strength of the film at a time of release is 550 gf/200 mm or lower.

5. The anionic group-modified polyvinyl alcohol-based water-soluble resin film according to claim 1, wherein, when two pieces of the anionic group-modified polyvinyl alcohol-based water-soluble resin film are heated and pressed by a seal bar to be sealed, an adhesion strength of the anionic group-modified polyvinyl alcohol-based water-soluble resin film per 70 mm of width, on the seal bar heated to 150° C., is 500 gf/70 mm or lower.

6. The anionic group-modified polyvinyl alcohol-based water-soluble resin film according to claim 2, wherein an alkali metal salt of fatty acid having 6 to 22 carbon atoms is contained as component D.

7. The anionic group-modified polyvinyl alcohol-based water-soluble resin film according to claim 2, obtained by coating on a metal roll an aqueous solution of anionic group-modified polyvinyl alcohol-based resin free from phosphorus atom-containing surfactant, drying the solution, and then releasing the resulting film from the metal roll, wherein a release strength of the film at a time of release is 550 gf/200 mm or lower.

8. The anionic group-modified polyvinyl alcohol-based water-soluble resin film according to claim 2, wherein, when two pieces of the anionic group-modified polyvinyl alcohol-based water-soluble resin film are heated and pressed by a seal bar to be sealed, an adhesion strength of the anionic group-modified polyvinyl alcohol-based water-soluble resin film per 70 mm of width, on the seal bar heated to 150° C., is 500 gf/70 mm or lower.

9. The anionic group-modified polyvinyl alcohol-based water-soluble resin film according to claim 3, obtained by coating on a metal roll an aqueous solution of anionic group-modified polyvinyl alcohol-based resin free from phosphorus atom-containing surfactant, drying the solution, and then releasing the resulting film from the metal roll, wherein a release strength of the film at a time of release is 550 gf/200 mm or lower.

10. The anionic group-modified polyvinyl alcohol-based water-soluble resin film according to claim 3, wherein, when two pieces of the anionic group-modified polyvinyl alcohol-based water-soluble resin film are heated and pressed by a seal bar to be sealed, an adhesion strength of the anionic group-modified polyvinyl alcohol-based water-soluble resin film per 70 mm of width, on the seal bar heated to 150° C., is 500 gf/70 mm or lower.

11. The anionic group-modified polyvinyl alcohol-based water-soluble resin film according to claim 4, wherein, when two pieces of the anionic group-modified polyvinyl alcohol-based water-soluble resin film are heated and pressed by a seal bar to be sealed, an adhesion strength of the anionic group-modified polyvinyl alcohol-based water-soluble resin film per 70 mm of width, on the seal bar heated to 150° C., is 500 gf/70 mm or lower.

12. The anionic group-modified polyvinyl alcohol-based water-soluble resin film according to claim 6, obtained by coating on a metal roll an aqueous solution of anionic group-modified polyvinyl alcohol-based resin free from phosphorus atom-containing surfactant, drying the solution, and then releasing the resulting film from the metal roll, wherein a release strength of the film at a time of release is 550 gf/200 mm or lower.

\* \* \* \* \*